(12) United States Patent
Wang

(10) Patent No.: US 6,789,854 B2
(45) Date of Patent: Sep. 14, 2004

(54) SECURING ELEMENT OF A WHEEL COVER

(76) Inventor: Hung-Sheng Wang, No. 29, Lane 766, Sec. 1, Jungjeng Rd., Rende Shiang, Tainan (TW)

(*) Notice: Subject to any disclaimer, the term of this patent is extended or adjusted under 35 U.S.C. 154(b) by 0 days.

(21) Appl. No.: 10/352,975

(22) Filed: Jan. 29, 2003

(65) Prior Publication Data

US 2004/0145234 A1 Jul. 29, 2004

(51) Int. Cl.[7] ............................................. B60B 7/12
(52) U.S. Cl. ............................... 301/37.33; 301/37.101
(58) Field of Search ..................... 301/37.102, 37.36, 301/37.31, 37.34, 37.12, 37.35, 37.42, 37.23, 37.24, 37.25, 37.107, 37.103, 37.104, 37.105, 37.106, 37.32, 37.101, 37.33

(56) References Cited

U.S. PATENT DOCUMENTS

| | | | | |
|---|---|---|---|---|
| 4,679,861 A | * | 7/1987 | Narita et al. | 301/37.42 |
| 4,895,414 A | * | 1/1990 | Fleming et al. | 301/37.36 |
| 5,083,841 A | * | 1/1992 | Fleming | 301/37.35 |
| 5,791,741 A | * | 8/1998 | Sheu | 301/37.34 |

* cited by examiner

Primary Examiner—Frantz F. Jules
(74) Attorney, Agent, or Firm—Rosenberg, Klein & Lee

(57) ABSTRACT

Securing elements are provided for securing a wheel cover to a wheel, and are pivotally connected to connecting projections equidistantly spaced near an edge of an inward side of a wheel cover. Each securing element has a connecting plate, which projects downwards from a lower end thereof, and which has an engaging block projecting from an inward side, and an engaging space formed right above the engaging block. The securing elements are joined to respective connecting projections so that the former can be pivoted on the latter between an upright in-use position where the engaging blocks are fitted into the engaging holes and a not-in-use laid down position where the engaging blocks are disengaged from the engaging holes and where the engaging spaces receive the bar-shaped portions therein. Thus, wheels covers equipped with the securing elements can occupy less space when stacked up in a pile.

2 Claims, 5 Drawing Sheets

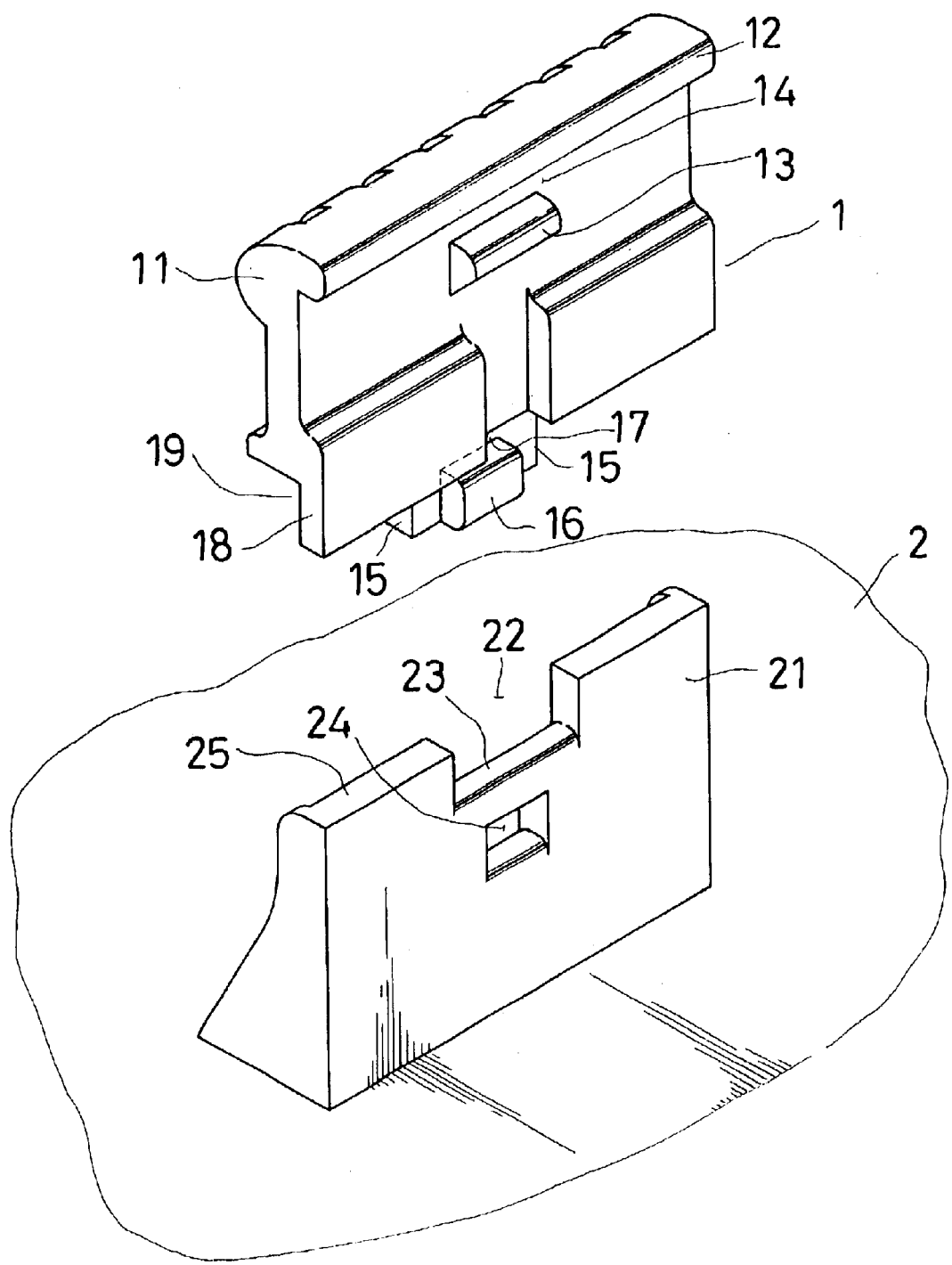
F I G. 1

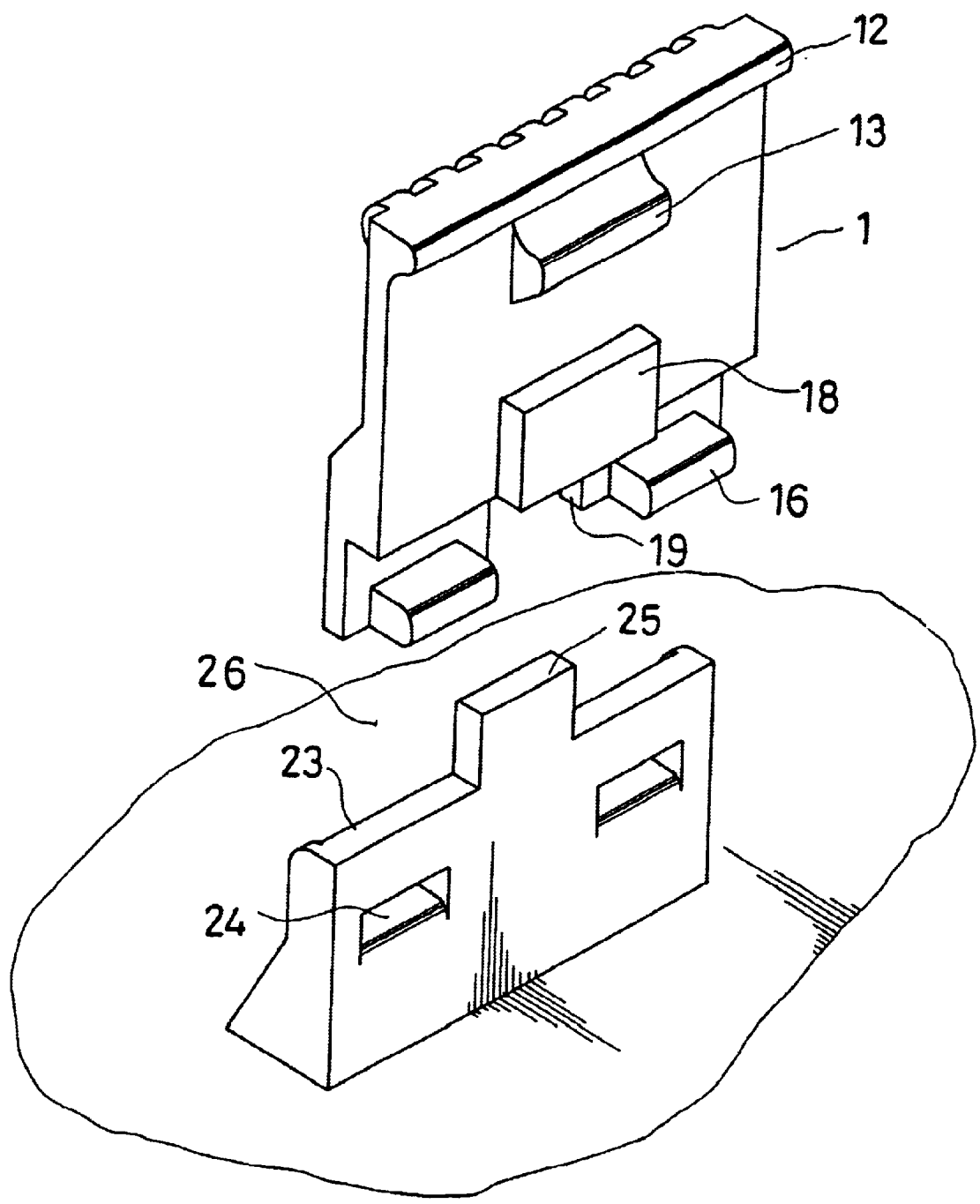
F I G. 4

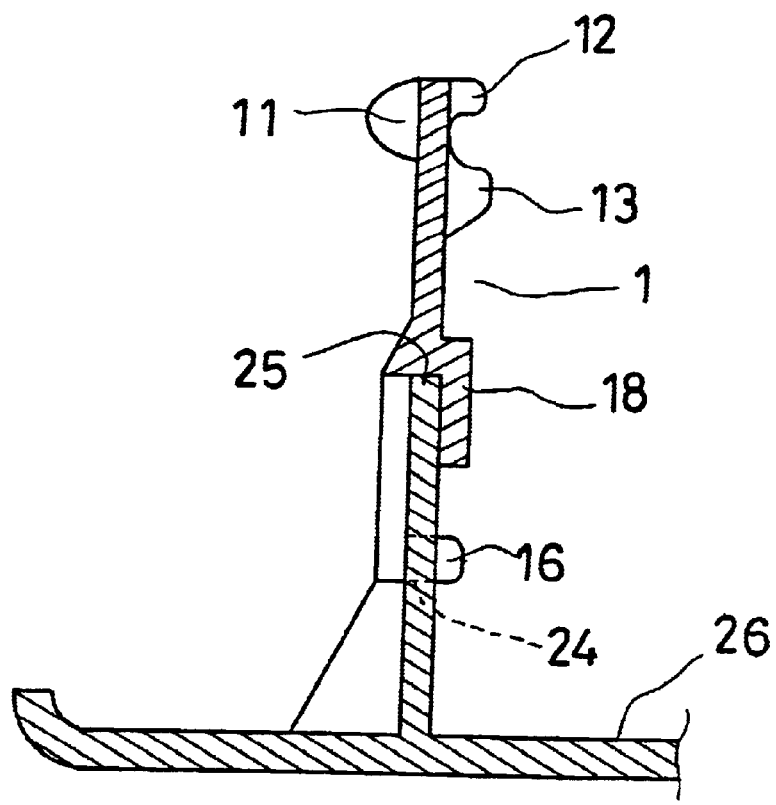
F I G. 5
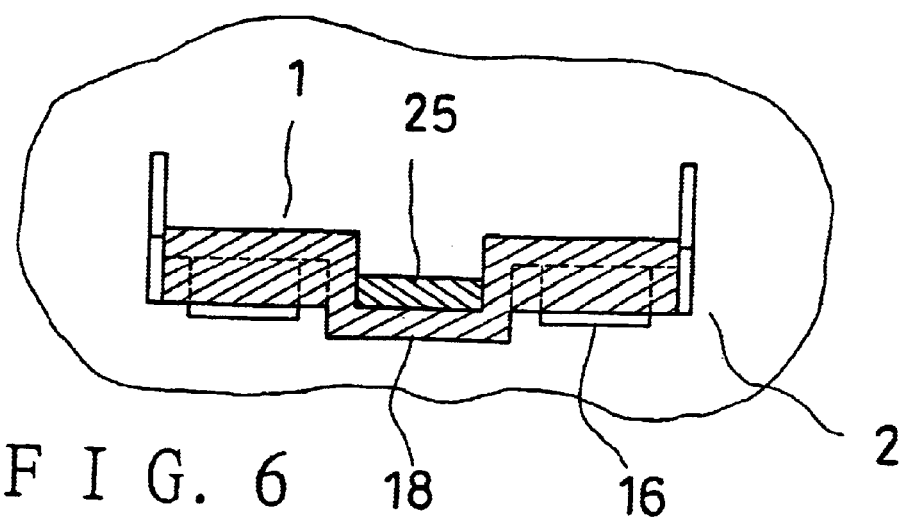
F I G. 6

SECURING ELEMENT OF A WHEEL COVER

BACKGROUND OF THE INVENTION

1. Field of the Invention

The present invention relates to a securing element of a wheel cover, more particularly a securing member, which can be easily fitted to a connecting protrusion of a wheel cover, and which can be pivoted to a not-in-use laid down position for allowing the wheel cover equipped with it to occupy less space when the wheel cover is placed on top of another one of the kind.

2. Brief Description of the Prior Art

Iron wheels of cars must have wheel covers fitted to them to look better because iron wheels are not made as attractive as aluminum wheels, which are more expensive and normally provided with such an appearance as to emit the feeling of high quality.

A kind of conventional wheel cover has securing elements equidistantly sticking out from an inner side and near to the edge thereof so that the wheel cover can be secured to an iron wheel by means of making protrusions of the securing elements engage an annular engaging trench of the wheel.

However, because the securing elements stick out from the wheel cover to a considerable height, the wheel cover will occupy relatively much space when it is placed on top of another wheel cover of the same kind. Consequently, when wheel covers of the same kind are stacked up in a pile, they will occupy more space to increase the cost of storage and transportation.

SUMMARY OF THE INVENTION

It is a main object of the present invention to provide securing elements to a wheel cover for connecting the wheel cover to a wheel, which can be pivoted to a laid-down position so that wheels covers equipped with them can occupy less space when stacked up in a pile.

A wheel cover has connecting projections equidistantly spaced near an edge of an inward side. Each securing element has a connecting plate, which projects down from a lower end, and which has an engaging block projecting from an inward side and an engaging space formed right above the engaging block. The securing elements are joined to respective connecting projections so that the former can be pivoted on the latter between an upright in-use position where the engaging blocks are fitted into the engaging holes and a not-in-use laid down position where the engaging blocks are disengaged from the engaging holes and where the engaging spaces receive the bar-shaped portions therein.

BRIEF DESCRIPTION OF THE DRAWINGS

The present invention will be better understood by reference to the accompanying drawings, wherein:

FIG. 1 is an exploded perspective view of the securing element of a wheel cover according to the present invention, FIG. 4 is an exploded perspective view of the securing element of a wheel cover according to the second embodiment, FIG. 5 is a fragmentary view of a wheel cover equipped with the securing element of the second embodiment, FIG. 6 is a top view of the securing element of the second embodiment; and, FIG. 7 is a view of stacked up wheel covers equipped with securing elements of the present invention.

DETAILED DESCRIPTION OF THE PREFERRED EMBODIMENTS

Figure 2:
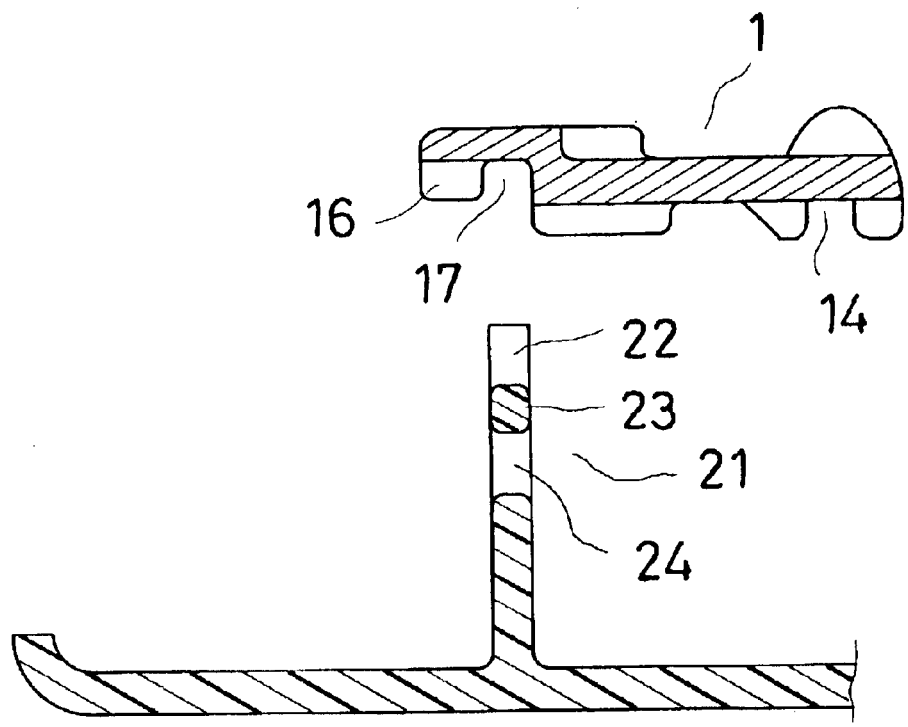
FIG. 2 is a view showing a first step of connecting the securing element of the present invention to a wheel cover.
Figure 3:
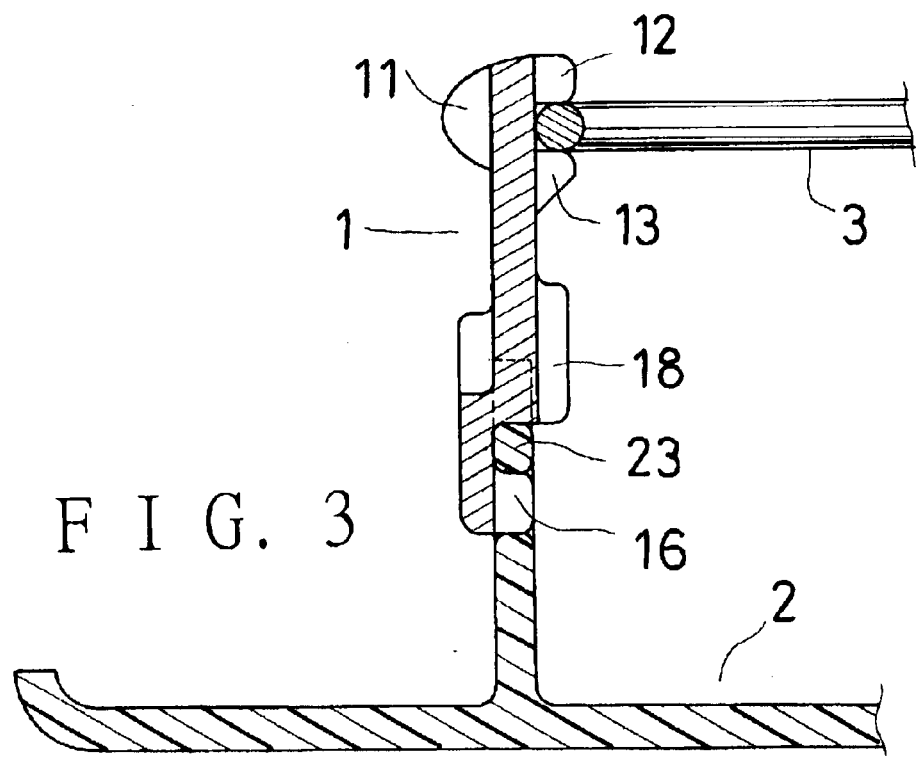
FIG. 3 is a fragmentary view of a wheel cover equipped with the securing element of the present invention.

Referring to FIG. 1, a wheel cover 2 has several connecting projections 21 equidistantly spaced on the inner side and near the edge thereof, which are provided for the securing elements 1 of the present invention to be connected to.

Each securing element 1 has a main body, a convexly curved portion 11 on an outward side of an upper end of the main body, juxtaposed locating protrusions 12, 13 on an inward side of an upper portion of the main body, a first connecting plate 15 extending down from a lower end of the main body, an engaging block 16 sticking out from an inward side of the first connecting plate 15, and two second connecting plates 18, 18 sticking down form the main body; holding spaces 19 are formed, which are defined by the main body and the second connecting plates 18, 18; an engaging space 15 is provided right above the engaging block 16; a holding trench 14 is formed between the locating protrusions 12, 13 for holding an iron ring in position. The convexly curved portions 11 of the securing elements 1 are intended to engage an annular trench of a wheel for connecting the wheel cover to the wheel.

Each connecting projection 21 has a gap 22 on a middle of an upper end thereof, and plates 25 beside the gap 22; an engaging hole 24 is formed in the middle, and in turn, a bar-shaped portion 23 is formed under the gap 22 and above the engaging hole 24.

To join the securing elements 1 to respective connecting projections 21, first each securing element 1 is first held in a laid-down position, and moved down from above respective connecting projection 21 so that the engaging space 17 thereof is fitted over the bar-shaped portion 23 of the respective connecting projection 21, and then the securing elements 1 is pivoted on the bar-shaped portion 23 until it is in an upright position where the engaging block 16 will be tightly fitted in the engaging hole 24 and the securing element 1 can't move left or right relative to the respective connecting projection 21. Thus, the securing elements 1 are joined to respective connecting projections 21 in an upright position with the engaging block 16 being tightly fitted into the engaging hole 24, and with the engaging space 17 receiving the bar-shaped portion 23 therein, and with the holding spaces 19 receiving the plates 25 therein. In addition, an iron ring 3 is fitted into the holding trenches 14 of the securing elements 1.

Referring to FIGS. 4 to 6, according to a second embodiment of the present invention, a wheel cover 2 has several connecting projections 22 instead of those 21 of the last embodiment, which are provided for holding the securing elements 1 of the second embodiment in position. The securing elements of the second embodiment are basically the same as those of the last embodiment except for some modifications; each securing element 1 has a main body, a convexly curved portion 11 on an outward side of an upper end of the main body, juxtaposed locating protrusions 12, 13 on an inward side of the main body, two juxtaposed connecting plates 15 extending down from a lower end of the main body, engaging blocks 16 projecting from an inward side of the first connecting plates 15, and a second connecting plate 18 at a middle of a lower end the main body; engaging spaces are provided right above the engaging blocks 16; a middle space is provided between the juxtaposed connecting plates 15 and under the second connecting plate 18. And, each connecting projection 21 has a plate projecting from a middle of an upper end thereof, two juxtaposed engaging holes 24, and two bar-shaped portions 23 right above the engaging holes 24. Thus, the securing elements 1 of the second embodiment can be joined to respective connecting projections 22 in an upright in-use position by means of tightly fitting the engaging blocks 16 into the engaging holes 24 like those of the last embodiment.

Figure 7:
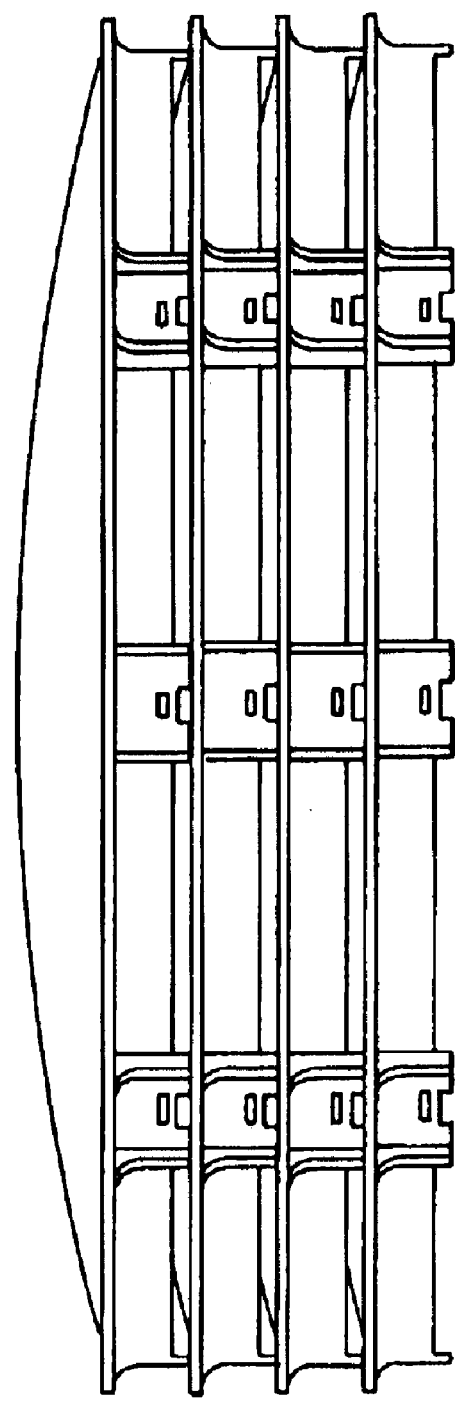

Referring to FIG. 7, if wheel covers are equipped with the securing elements of the present invention, they can be placed relatively close to adjacent wheel covers when they are stacked up in a pile because the securing elements can be first pivoted to a not-in-use laid down position. Therefore, the present wheel covers occupy less space when they are stacked up in a pile, and in turn, the cost of storage and transportation is lower as compared with the conventional wheel covers as described in the Background, which have unmovable securing elements projecting from an inner side to a considerable height. Furthermore, the securing elements of the present invention have an advantages that they can be easily fitted to the connecting projections by the users, and can't easily fall off.

What is claimed is:

1. Securing elements of a wheel cover, each comprising:
    a convexly curved portion formed on an outward side of an upper end thereof for engagement with an annular trench of a wheel,
    two juxtaposed locating protrusions on an inward side of an upper portion thereof for holding an iron ring in position; each securing element being pivotally connected to a respective one of connecting projections equidistantly spaced on an inward side of the wheel cover and near an edge of the wheel cover; each connecting projection of the wheel cover having a gap on a middle of an upper end thereof, an engaging hole under the gap, and a bar-shaped portion between the gap and the engaging hole;
    and each securing element including a first connecting plate projecting downwards from a lower end thereof; the first connecting plate having an engaging block projecting from an inward side thereof, and an engaging space formed right above the engaging block thereof;
    whereby the securing elements can be pivoted on respective connecting projections between an upright in-use position where the engaging blocks are fitted into the engaging holes of the connecting projections and a not-in-use laid down position where the engaging blocks are disengaged from the engaging holes and where the engaging spaces receive the bar-shaped portions of the connecting projections therein.

2. Securing elements of a wheel cover, each comprising:
    a convexly curved portion formed on an outward side of an upper end thereof for engagement with an annular trench of a wheel,
    two juxtaposed locating protrusions on an inward side of an upper portion thereof for holding an iron ring in position; each securing element being pivotally connected to a respective one of connecting projections equidistantly spaced on an inward side of the wheel cover and near an edge of the wheel cover; each connecting projection of the wheel cover having plate projecting upwards from a middle of an upper end thereof, two juxtaposed engaging holes, and two bar-shaped portions extending from the upper end thereof to edges of the engaging holes thereof;
    and each securing element including two juxtaposed connecting plates projecting downwards from a lower end thereof; each connecting plate having an engaging block projecting from an inward side thereof, and an engaging space formed right above the engaging block thereof; a middle space being provided between the juxtaposed connecting plates;
    whereby the securing elements can be pivoted on respective connecting projections between an upright in-use position where the engaging blocks are fitted into the engaging holes of the connecting projections and a not-in-use laid down position where the engaging blocks are disengaged from the engaging holes and where the engaging spaces receive the bar-shaped portions of the connecting projections therein.

* * * * *